(12) United States Patent
Zhang

(10) Patent No.: US 8,254,115 B2
(45) Date of Patent: Aug. 28, 2012

(54) SLIDE MECHANISM FOR SLIDE-TYPE PORTABLE ELECTRONIC DEVICE

(75) Inventor: Yu Zhang, Shenzhen (CN)

(73) Assignees: Shenzhen Futaihong Precision Industry Co., Ltd., ShenZhen, Guangdong Province (CN); FIH (Hong Kong) Limited, Kowloon (HK)

(*) Notice: Subject to any disclaimer, the term of this patent is extended or adjusted under 35 U.S.C. 154(b) by 239 days.

(21) Appl. No.: 12/771,248

(22) Filed: Apr. 30, 2010

(65) Prior Publication Data
US 2011/0051332 A1 Mar. 3, 2011

(30) Foreign Application Priority Data
Aug. 28, 2009 (CN) .......................... 2009 1 0306307

(51) Int. Cl.
*G06F 1/16* (2006.01)
*G06F 3/02* (2006.01)
*H04M 1/00* (2006.01)

(52) U.S. Cl. ......... 361/679.56; 361/679.55; 361/679.57; 361/679.58; 455/575.1; 455/575.4; 345/168; 345/169; 345/905

(58) Field of Classification Search ............ 361/679.55–679.59, 679.01–679.45; 455/575.1, 575.4, 455/575.3; 345/156, 157, 168, 169, 905
See application file for complete search history.

(56) References Cited

U.S. PATENT DOCUMENTS

| | | | | |
|---|---|---|---|---|
| 7,162,283 | B2* | 1/2007 | Bae et al. | 455/575.4 |
| 7,627,355 | B2* | 12/2009 | Amano et al. | 455/575.4 |
| 7,697,280 | B2* | 4/2010 | Wang | 361/679.55 |
| 7,755,892 | B2* | 7/2010 | Wang et al. | 361/679.55 |
| 7,983,725 | B2* | 7/2011 | Zhang et al. | 455/575.4 |
| 2008/0167098 | A1* | 7/2008 | Mizuta et al. | 455/575.4 |
| 2009/0305754 | A1* | 12/2009 | Yuan | 455/575.4 |

* cited by examiner

*Primary Examiner* — Jayprakash N Gandhi
*Assistant Examiner* — Nidhi Desai
(74) *Attorney, Agent, or Firm* — Altis Law Group, Inc.

(57) ABSTRACT

A slide mechanism includes a main plate, a slide plate, a locking module and a button. The slide plate is installed on the main plate and slidable relative to the main plate. The locking module is attached to the slide plate and locks with the main plate. The button operates the locking module to unlock the main plate.

15 Claims, 9 Drawing Sheets

SLIDE MECHANISM FOR SLIDE-TYPE PORTABLE ELECTRONIC DEVICE

CROSS-REFERENCE TO RELATED APPLICATION

This application is related to co-pending U.S. Patent Application Ser. No. 12/771,291, entitled "SLIDE MECHANISM FOR SLIDE-TYPE PORTABLE ELECTRONIC DEVICE", by Yu Zhang, which has the same assignee as the present application. The above-identified application is incorporated herein by reference.

BACKGROUND

1. Technical Field

The present disclosure generally relates to slide mechanisms and, particularly, to a portable electronic device with two or more housings using a sliding mechanism that allows one housing to slide relative to another housing in a longitudinal direction.

2. Description of Related Art

Slide-type portable electronic devices have two housings, of which one typically slides over the other to open/close the portable electronic device.

A slide mechanism is generally used in the slide-type portable electronic device for driving the sliding between the two housings. However, the slide mechanism needs firstly to be slid to a predetermined position by hand, then the mechanism takes over to automatically open the portable electronic device. It can be inconvenient to operate the portable electronic device in this manner.

Therefore, there is room for improvement within the art.

BRIEF DESCRIPTION OF THE DRAWINGS

Many aspects of the slide mechanism for slide-type portable electronic device can be better understood with reference to the following drawings. The components in the drawings are not necessarily drawn to scale, the emphasis instead being placed upon clearly illustrating the principles of the slide mechanism for slide-type portable electronic device. Moreover, in the drawings, like reference numerals designate corresponding parts throughout the several views.

DETAILED DESCRIPTION

Figure 1:
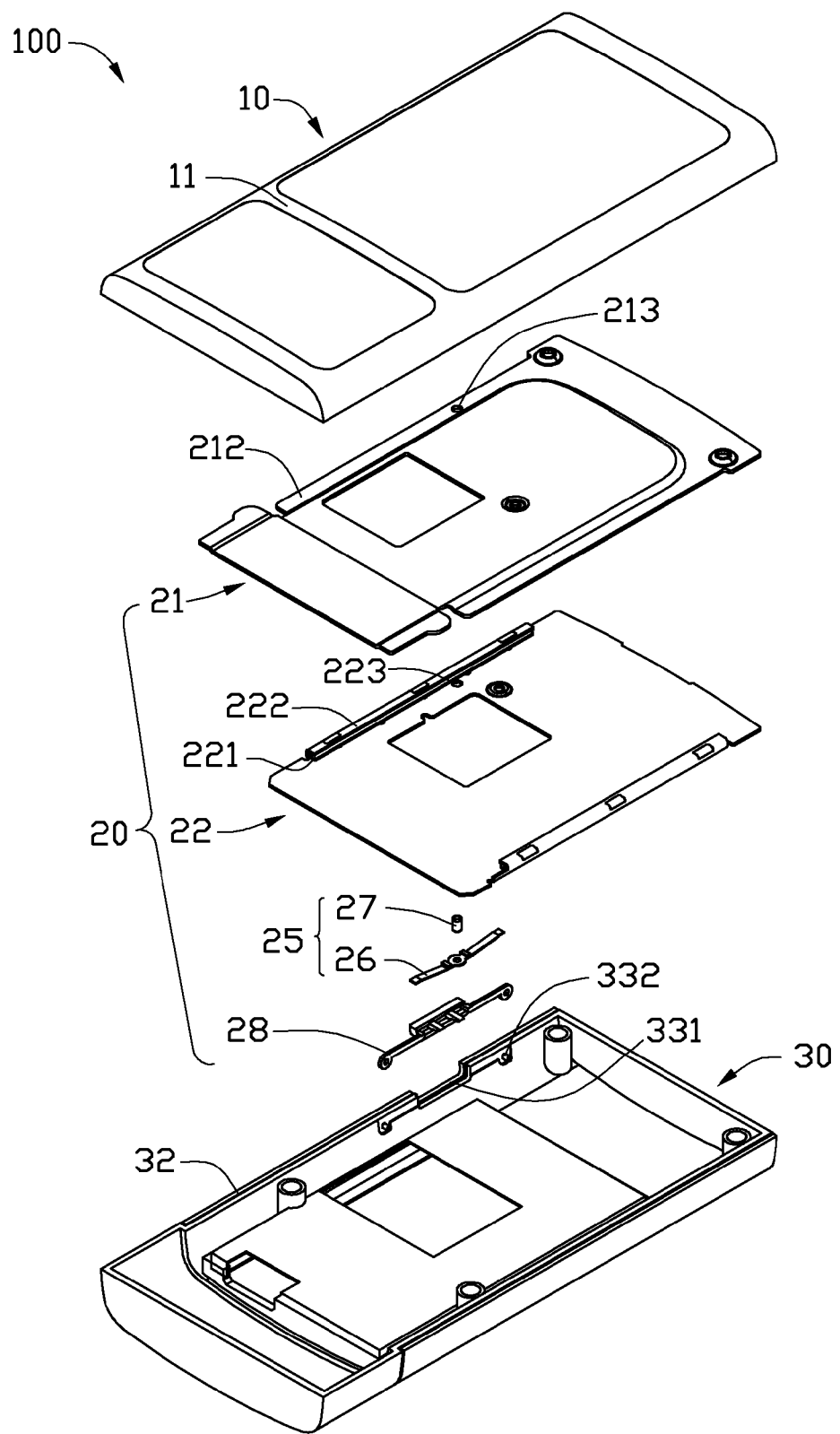
FIG. 1 is an exploded and isometric view of a portable electronic device using a slide mechanism according to an exemplary embodiment.
Figure 2:
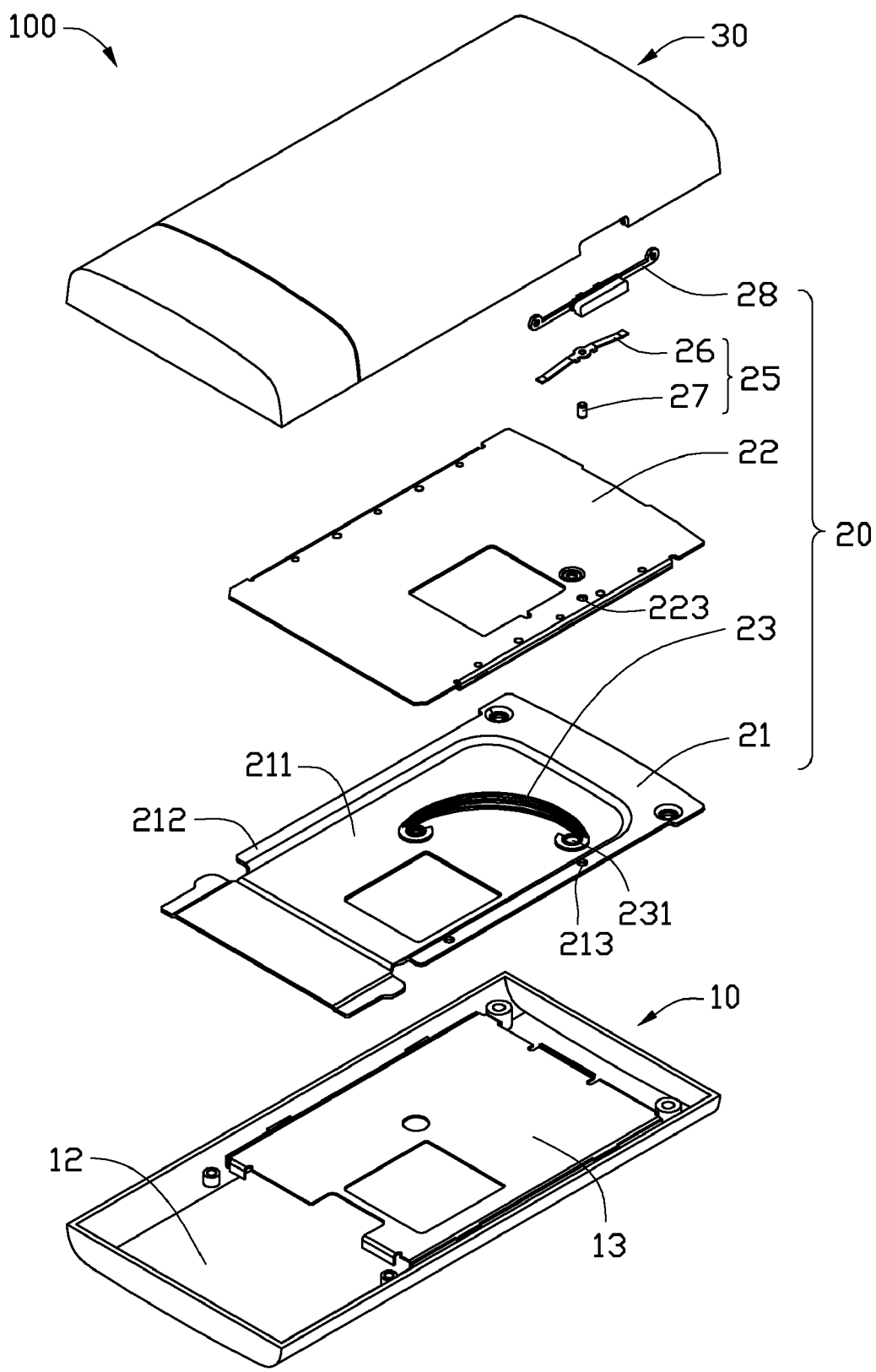
FIG. 2 is similar to FIG. 1 but showing another aspect of the slide mechanism.

FIGS. 1 and 2 show an exemplary slide mechanism 20 used in a slide-type portable electronic device 100 such as a mobile phone, a personal digital assistant, etc. The portable electronic device 100 includes a first housing 10 and a second housing 30 engaged with the first housing 10. The slide mechanism 20 provides an elastic force sufficient to slide the first and second housings 10 and 30 relative to each other. The slide mechanism 20 includes a main plate 21, a slide plate 22, a group of elastic members 23, a locking module 25, and a button 28. The slide plate 22 and the main plate 21 are fixed to the second housing 30 and the first housing 10, respectively. The locking module 25 and the button 28 are configured for releasably locking the slide plate 22 to the main plate 21.

The first housing 10 may be a cover of the portable electronic device, and includes a first surface 11 and a second surface 12. The first surface 11 may have a function key and a display. A mounted plate 13 is fixed to the second surface 12 of the first housing 10.

The main plate 21 is configured for being fixed to the mounted plate 13 of the first housing 10 by way of, for example, hot melting. The main plate 21 includes a recessed portion 211 and two generally L-shaped rail portions 212 extending from two opposite edge ends of the main plate 21. One of the rail portions 212 defines a first through hole 213.

The slide plate 22 is shorter than the main plate 21. The slide plate 22 includes a slide portion 222 at each of two opposite borders thereof. The two slide portions 222 are generally U-shaped bars defining a slide groove 221 corresponding to the two rail portions 212. The rail portions 212 can slide along the slide groove 221. The slide plate 22 defines a second through hole 223 corresponding to the first through hole 213.

The group of elastic members 23 are made of a plurality of torsion springs having connecting portions 231 at their respective ends. The connecting portions 231 are configured to be respectively secured to the main plate 21 and the slide plate 22. The group of elastic members 23 are designed to have a predetermined torsion force to drive the main plate 21 to slide relative to the slide plate 22 to a closed state.

Figure 3:
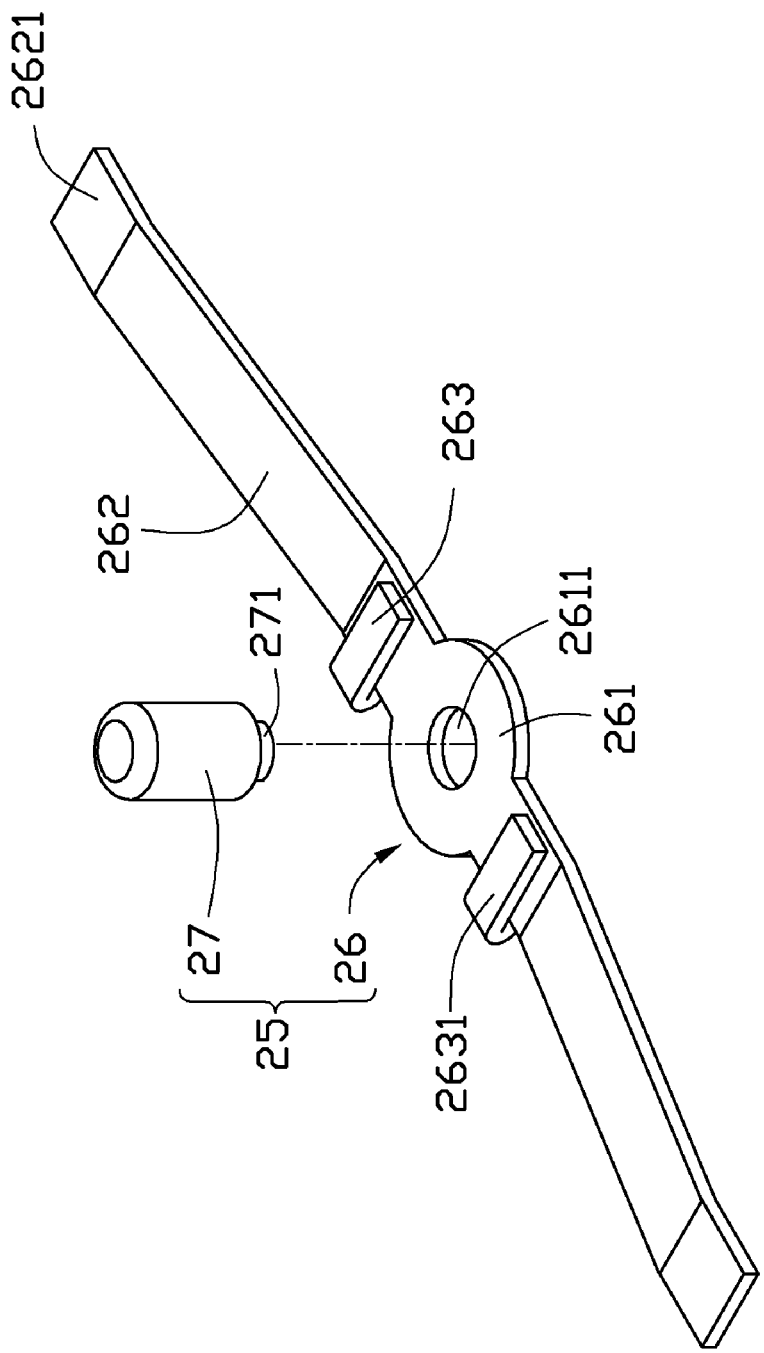
FIG. 3 is an enlarged view of a locking module in FIG. 1.

The locking module 25 prevents the slide plate 22 from sliding relative to the main plate 21 when in a closed state. Referring to FIG. 3, the locking module 25 includes an elastic sheet 26 and a column 27. The elastic sheet 26 may be stamped or punched from an elastic sheet, and includes a disk body 261, two arms 262, and two ribs 263. Each arm 262 respectively extends at an angle from two sides of the disk body 261, and together constitute an arched shape. Each arm 262 has a distal end 2621 configured for being fixed to the slide plate 22. Two ribs 263 are positioned at two sides of the disk body 261. The disk body 261 defines a bore 2611. When the elastic sheet 26 is assembled to the slide plate 22, the bore 2611, the first through hole 213, and the second through hole 223 are aligned with each other. The post 27 has a thinner end 271. The thinner end 271 is configured to be tightly engaged in the bore 2611.

Figure 4:
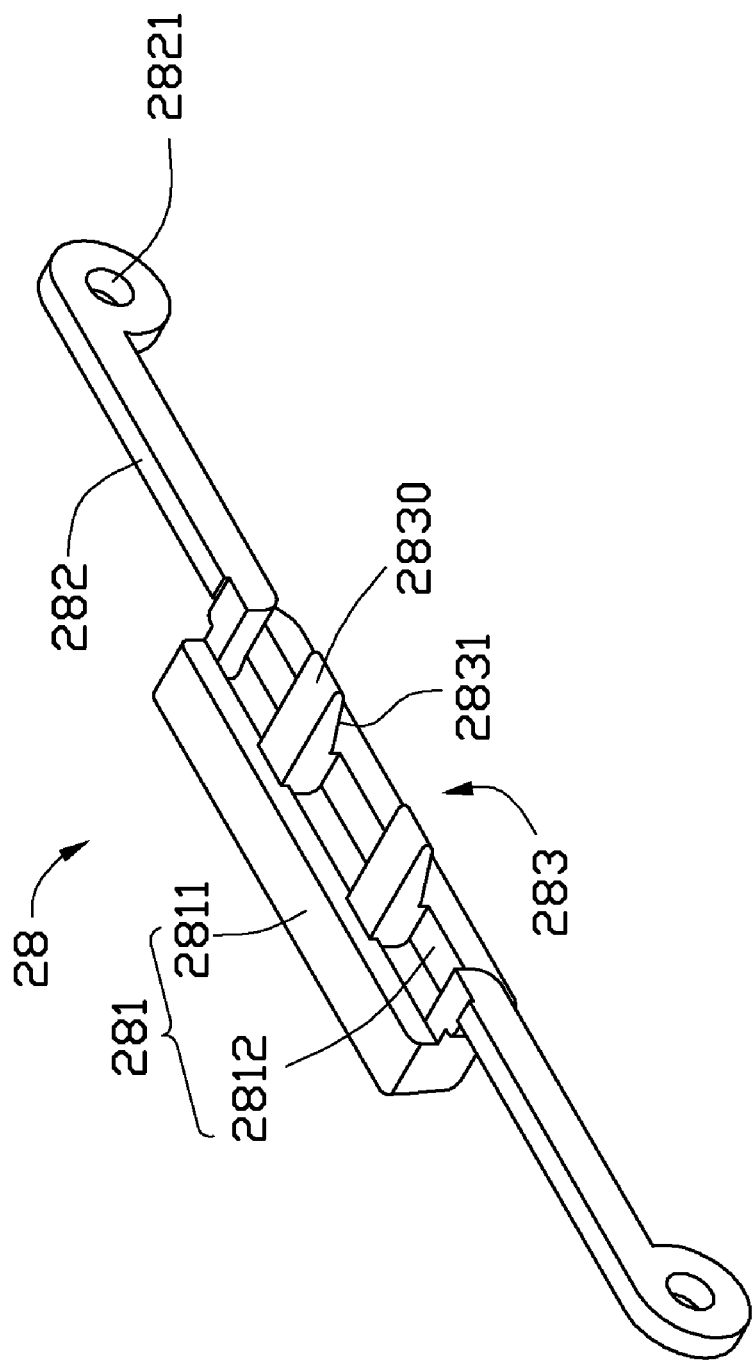
FIG. 4 is an enlarged view of a button in FIG. 1.
Figure 5:
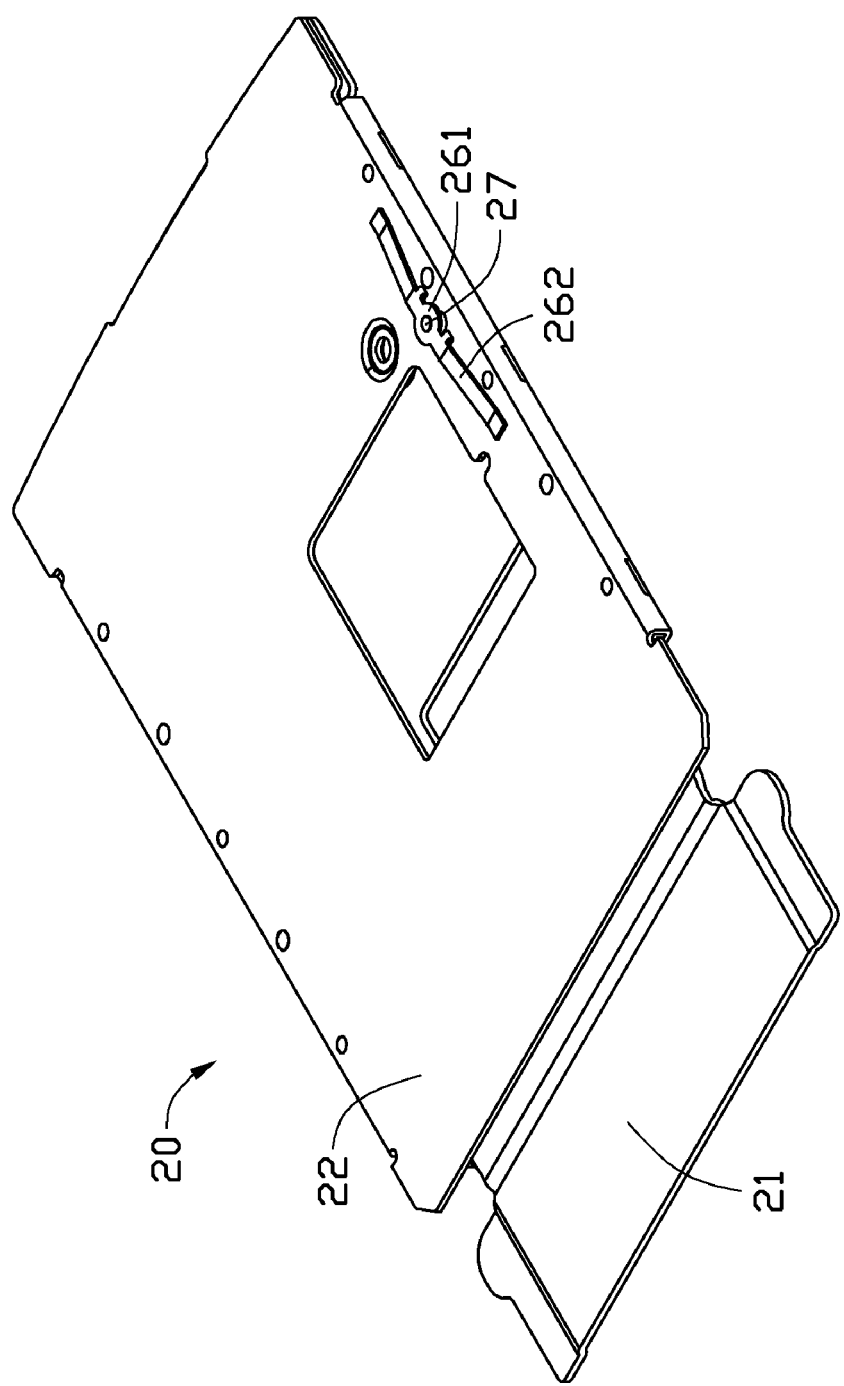
FIG. 5 is a partially assembled view of the locking module fixed to the main plate in FIG. 1.
Figure 6:
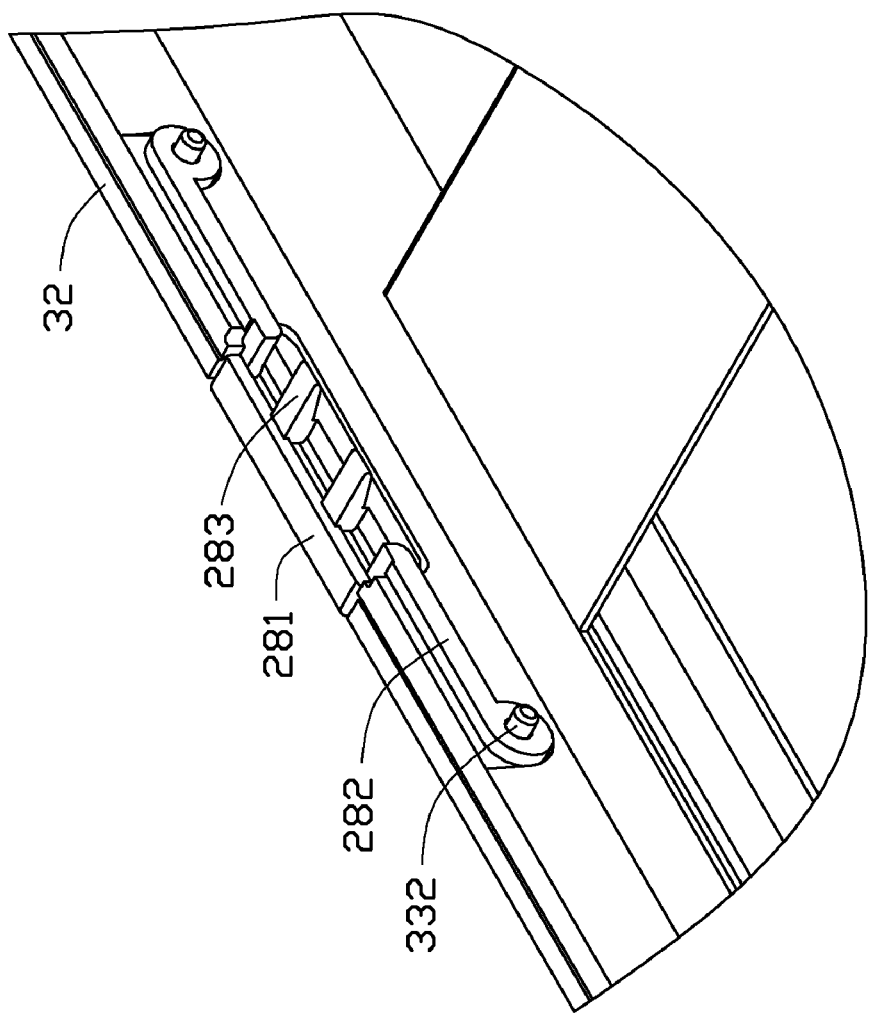
FIG. 6 is an enlarged view of the button assembled to the second housing.
Figure 7:
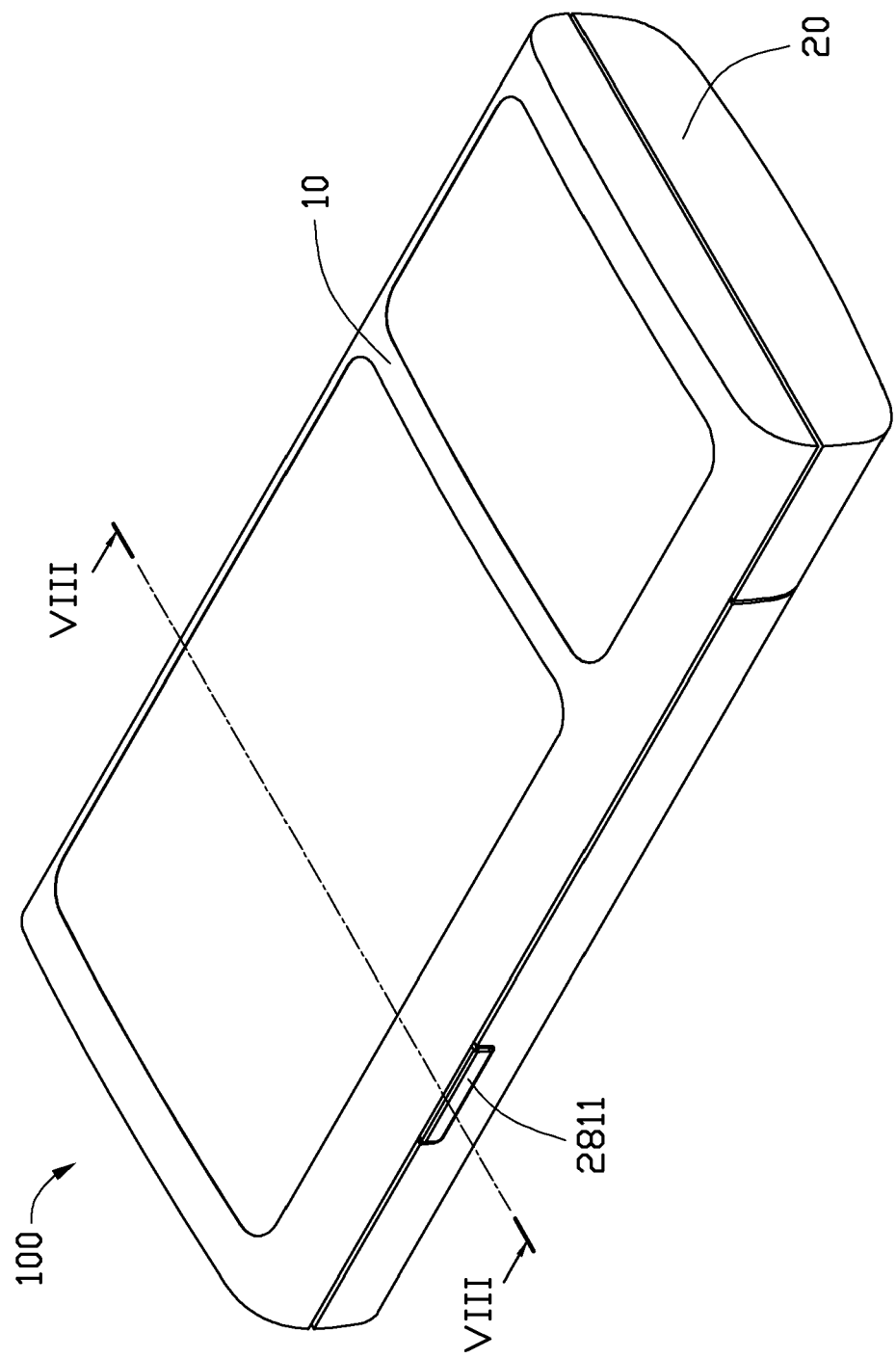
FIG. 7 is an assembled view of the portable electronic device.
Figure 8:
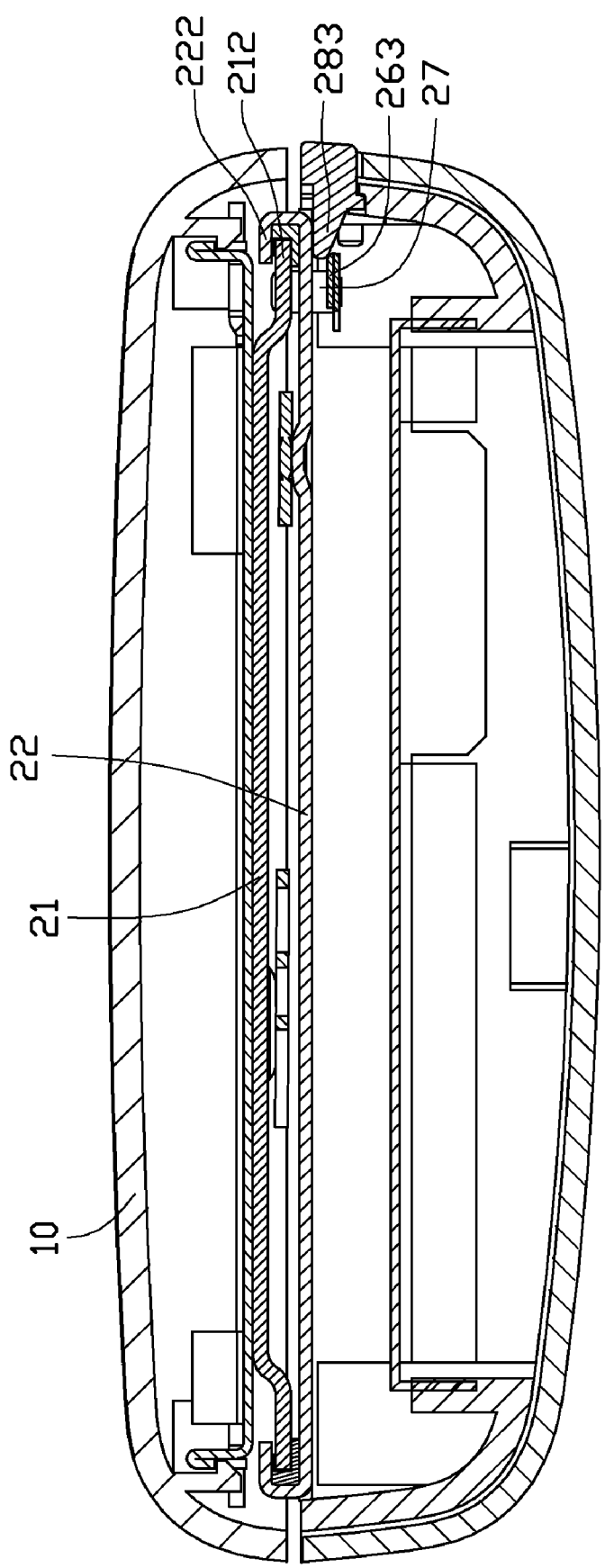
FIG. 8 is a cross-sectional view of FIG. 7 along line VIII-VIII.
Figure 9:
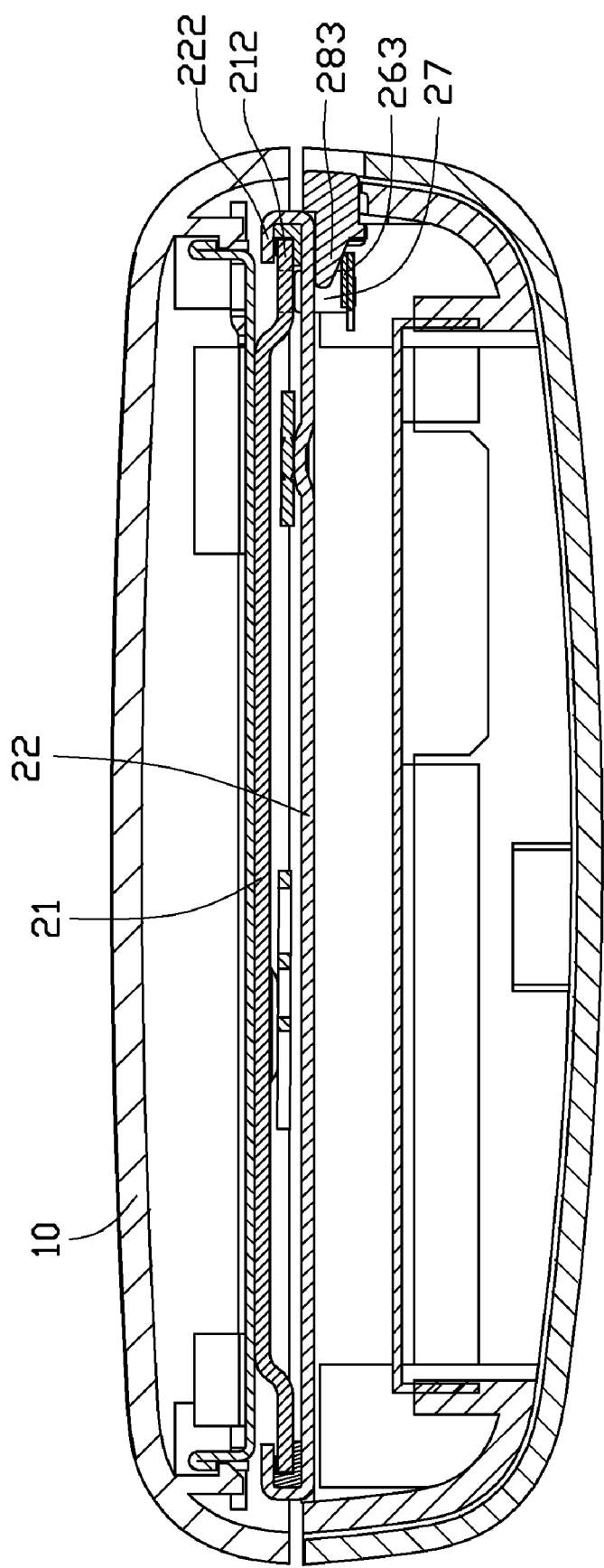
FIG. 9 is similar to FIG. 8, but showing the slide mechanism in an unlocked position.

Referring to FIG. 4, the button 28 includes a button portion 281, two rods 282, and a resisting portion 283. The button portion 281 includes an operation portion 2811 integrally formed with a support portion 2812. A rod 282 extends from each of two ends of the support portion 2812. A distal end of each rod 282 is substantially circular, and defines an aperture 2821. The resisting portion 283 is formed on the support portions 2812, and is positioned between the rods 282. The resisting portion 283 includes a plurality of wedge blocks 2830. Each wedge block 2830 forms a wedge surface 2831.

The second housing 30 has a shape substantially corresponding to the first housing 10. The second housing 30 includes two sidewalls 32. One of the sidewalls 32 defines an opening 331, and forms a post 332 at each of two sides of the opening 331.

Referring to FIGS. 5 to 9, when the slide mechanism 20 is assembled, the main plate 21 is mounted to the mounted plate 13 of the first housing 10. The connecting portions 231 are respectively secured to the main plate 21 and the slide plate 22. The slide plate 22 covers a part of the main plate 21 and can slide relative to the main plate 21. The rail portions 212 are received in and can linearly slide within the slide grooves 221. Then, distal ends 2621 of the elastic sheet 26 are fixed to one side of the slide plate 22 far away from the main plate 21 by way of, for example, hot melting. The thinner end 271 of the column 27 is tightly engaged in the bore 2611. Another end of the column 27 extends through the second through hole 223 and the first through hole 213. Since the arms 262 are tilted, the elastic sheet 26 is spaced from the slide plate 22. The button 28 is attached to the second housing 30. The operation portion 2811 is received in the opening 331, and the rods 282 are fixed to the posts 332. The second housing 30 is attached to the slide plate 22. The wedge block 2830 abut against the ribs 263. Thus, the slide mechanism 20 is in a closed position and the portable electronic device 100 is in a closed state.

Referring back to FIG. 3-5, when the slide mechanism 20 is to be driven from the opened position to the closed position, the operation portion 2811 is pressed to force the wedge blocks 2830 to push the ribs 263. The ribs 263 move away from the slide plate 22. The column 27 is released from the first through hole 213 to unlock the main plate 21. Accordingly, the slide plate 22 can automatically slide further relative to the main plate 21.

It is to be understood, however, that even through numerous characteristics and advantages of the exemplary disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A slide mechanism, comprising: a main plate; a slide plate installed on the main plate and slidable relative to the main plate; a locking module attached to the slide plate and locking with the main plate, the locking module including an elastic sheet, the elastic sheet including a disk body, two arms and two ribs, each arm respectively extending at an angle from two sides of the disk body, and two ribs positioned at two sides of the disk body; and a button operating the locking module to unlock the main plate; wherein the locking module includes a column, two ends of the elastic sheet are fixed to the slide plate, and one end of the column is fixed to the elastic sheet, another end of the column is locked with the slide plate and the main plate.

2. The slide mechanism as claimed in claim 1, wherein the disk body defines a bore, the main plate defines a first through hole, the slide plate defines a second through hole, and the bore, the first through hole and the second through hole are aligned with each other.

3. The slide mechanism as claimed in claim 2, wherein the column has a thinner end fixed to the bore, the other end extends through the bore, the second through hole to latch in the first through hole.

4. The slide mechanism as claimed in claim 1, wherein the button includes a button portion, two rods and a resisting portion, and two rods extend from two ends of the button portion.

5. The slide mechanism as claimed in claim 4, wherein the button portion includes an operation portion and a support portion integrally formed together, and the resisting portion is formed on the support portions, and is positioned between the rods.

6. The slide mechanism as claimed in claim 5, wherein a distal end of the rod is substantially circular, and defines an aperture.

7. The slide mechanism as claimed in claim 5, wherein resisting portion includes a plurality of wedge blocks, and each wedge block forms a wedge surface, the wedge surfaces abut against the ribs.

8. A portable electronic device, comprising: a first housing; a second housing slidably installed on the first housing; a slide mechanism, comprising: a main plate; a slide plate installed on the main plate and slidable relative to the main plate; a locking module attached to the slide plate and locking with the main plate, the locking module including an elastic sheet and a column, the elastic sheet fixed to the slide plate, and the column locked with the slide plate and the main plate; and a button including a resisting portion, the resisting portion including at least one wedge block abutting against the elastic sheet; wherein the button is pressed to force the wedge block to push the elastic sheet, the column unlocks the main plate to allow the slide plate to automatically slide relative to the main plate; wherein the button includes a button portion, and two rods, and two rods extend from two ends of the button portion, the button portion includes an operation portion and a support portion integrally formed together, the resisting portion is formed on the support portions, and is positioned between the rods.

9. The portable electronic device as claimed in claim 8, wherein the resisting portion includes a plurality of wedge blocks, each wedge block forms a wedge surface.

10. The portable electronic device as claimed in claim 9, wherein two ends of the metal plate is fixed to the slide plate, the wedge surfaces abut against the elastic sheet, one end of the column is fixed to the elastic sheet, another end of the column is locked in the slide plate and the main plate.

11. The portable electronic device as claimed in claim 10, wherein the elastic sheet includes a disk body, two arms and two ribs, each arm respectively extends at an angle from two sides of the disk body, and two ribs are positioned at two sides of the disk body, the wedge surfaces abut against the ribs.

12. The portable electronic device as claimed in claim 8, wherein the main plate comprises two rail portions, and the slide plate forms two slide portions, the slide portions sliding along the rail portions.

13. The portable electronic device as claimed in claim 12, wherein the slide portions define two slide grooves, the rail portions received in the slide grooves and configured for linearly sliding within the slide grooves.

14. A slide mechanism, comprising: a main plate; a slide plate installed on the main plate and slidable relative to the main plate; a locking module attached to the slide plate and locking with the main plate, the locking module including an elastic sheet; and a button including a resisting portion, the resisting portion including a plurality of wedge blocks, and each wedge block forming a wedge surface abutting against the elastic sheet, the button operating the locking module to unlock the main plate; wherein the elastic sheet including a disk body, two arms and two ribs, each arm respectively extending at an angle from two sides of the disk body, and two ribs positioned at two sides of the disk body, the wedge surfaces abut against the ribs.

15. The slide mechanism as claimed in claim 14, wherein the locking module includes a column, two ends of the elastic sheet are fixed to the slide plate, and one end of the column is fixed to the elastic sheet, another end of the column is locked with the slide plate and the main plate.

* * * * *